(12) United States Patent
Brendel et al.

(10) Patent No.: US 9,299,169 B2
(45) Date of Patent: Mar. 29, 2016

(54) ITERATIVE RECONSTRUCTION ALGORITHM WITH A CONSTANT VARIANCE BASED WEIGHTING FACTOR

(75) Inventors: Bernhard Johannes Brendel, Norderstedt (DE); Thomas Koehler, Norderstedt (DE); Holger Schmitt, Hamburg (DE); Rolf Dieter Bippus, Hamburg (DE); Roland Proksa, Neu Wulmstorf (DE)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 369 days.

(21) Appl. No.: 13/990,450

(22) PCT Filed: Nov. 25, 2011

(86) PCT No.: PCT/IB2011/055307
§ 371 (c)(1),
(2), (4) Date: May 30, 2013

(87) PCT Pub. No.: WO2012/073167
PCT Pub. Date: Jun. 7, 2012

(65) Prior Publication Data
US 2013/0251286 A1    Sep. 26, 2013

Related U.S. Application Data

(60) Provisional application No. 61/418,146, filed on Nov. 30, 2010.

(51) Int. Cl.
*G06T 11/00*    (2006.01)

(52) U.S. Cl.
CPC ............ *G06T 11/003* (2013.01); *G06T 11/006* (2013.01); *G06T 2211/424* (2013.01)

(58) Field of Classification Search
None
See application file for complete search history.

(56) References Cited

U.S. PATENT DOCUMENTS 4,665,390 A * 5/1987 Kern et al. ............... 340/587
5,406,598 A * 4/1995 Takeuchi et al. ........ 376/254
(Continued)

FOREIGN PATENT DOCUMENTS

WO    03071483 A2    8/2003

OTHER PUBLICATIONS

Fessler, Jeffrey. "Penalized weighted least-squares image reconstruction for positron emission tomography." Medical Imaging, IEEE Transactions on 13.2 (1994): 290-300.*

(Continued)

*Primary Examiner* — Michelle Entezari

(57) ABSTRACT

A method includes reconstructing measured projection data using an iterative statistical reconstruction algorithm that reduces image artifact caused by differences in variances in projections of the measured projection data used to update a voxel of the image for one or more voxels of the image. A reconstructor includes a processor that reconstructs measured projection data using an iterative statistical reconstruction algorithm that reduces or mitigates image artifact caused by differences in variances in projections used to update a voxel of the image for one or more voxels of the image. A computer readable storage medium encoded with computer executable instructions, which, when executed by a processor of a computer, cause the processor to: reduce image artifact caused by differences in variances in projections used to update a voxel of an image for one or more voxels of the image using an iterative statistical reconstruction algorithm.

20 Claims, 4 Drawing Sheets

(56) References Cited

U.S. PATENT DOCUMENTS

| | | | |
|---|---|---|---|
| 6,584,413 | B1 | 6/2003 | Keenan et al. |
| 7,251,306 | B2 | 7/2007 | Sauer et al. |
| 7,519,143 | B2 | 4/2009 | Debasish et al. |
| 8,463,363 | B2 * | 6/2013 | Blevis .............. A61B 6/037 382/199 |
| 8,503,755 | B2 * | 8/2013 | Jerebko ............ A61B 6/025 382/132 |
| 8,913,810 | B2 * | 12/2014 | Panin ................ G06T 11/006 382/128 |
| 2003/0076988 | A1 | 4/2003 | Liang et al. |
| 2005/0105682 | A1 * | 5/2005 | Heumann et al. ............ 378/58 |
| 2008/0042067 | A1 | 2/2008 | Rousso et al. |
| 2008/0205729 | A1 | 8/2008 | Ziegler |
| 2010/0034353 | A1 * | 2/2010 | Kravis et al. ................ 378/87 |
| 2012/0051664 | A1 * | 3/2012 | Gopalakrishnan et al. ... 382/294 |

OTHER PUBLICATIONS

Politte, David G., and Donald L. Snyder. "Corrections for accidental coincidences and attenuation in maximum-likelihood image reconstruction for positronemission tomography." Medical Imaging, IEEE Transactions on 10.1 (1991): 82-89.*

Aristophanous, Michalis, et al. "A Gaussian mixture model for definition of lung tumor volumes in positron emission tomography." Medical physics 34.11 (2007): 4223-4235.*

Wieczorek: "The Image Quality of FBP and MLEM Reconstruction"; Phys. Med. Biol. 55 (2010), pp. 3161-3176.

\* cited by examiner

ITERATIVE RECONSTRUCTION ALGORITHM WITH A CONSTANT VARIANCE BASED WEIGHTING FACTOR

The following generally relates to imaging and more particular to tomographic reconstruction using an iterative statistical reconstruction algorithm that includes an image voxel update term with a constant variance based weighting factor.

A conventional CT scanner includes an x-ray tube that emits radiation. A source collimator is disposed between the x-ray tube and an examination region and collimates the emitted radiation to produce a fan or cone shaped x-ray beam. The collimated beam traverses the examination region and an object or subject therein (which attenuates the beam as a function of the radiodensity of the object or subject) and illuminates a detector array disposed across the examination region from the x-ray tube. The detector produces projection data indicative of the detected radiation. A reconstructor reconstructs the projection data, generating volumetric image data indicative of the object or subject.

Reconstruction algorithms include non-iterative reconstruction algorithms such as filtered back projection (FBP) and iterative reconstruction algorithms such as algebraic and statistical based reconstruction algorithms. Statistical iterative reconstruction algorithms have incorporated noise models by forming an equation describing the likelihood that the reconstructed image belongs to the measured projection data. This equation is used as an objective function for an iterative maximization method, and the result of the maximization is the image of an object that "most likely" produced the measured projection data.

The noise model can be incorporated by estimating the variances of all measurements in all projections and weighting the update contributions of measurements for one voxel with the reciprocals of the corresponding variances. If a reconstruction grid with overlapping basis functions is used (e.g. blobs) and/or if the reconstruction grid is coarse, a plurality of rays of each projection intersects the voxel or blob, and a number of measurements from neighboring detector pixels of each projection contribute to the update of the voxel or blob.

Each of these measurements has an individual variance, which can differ significantly from each other if an edge between two materials with significantly different x-ray attenuation (e.g. bone and soft tissue or soft tissue and air) is projected onto the detector. Due to the variance weighting of the update, the measurements with low variance (those, which have seen low attenuation) have more influence on the update than the measurements with high variance (those, which have seen high attenuation). Unfortunately, this may lead to a systematic error in the updates and, in consequence, introduce streak artifacts into the image.

Aspects of the present application address the above-referenced matters and others.

According to one aspect, a method includes reconstructing measured projection data using an iterative statistical reconstruction algorithm that reduces or mitigates image artifact caused by differences in variances in projections of the measured projection data used to update a voxel of the image for one or more voxels of the image According to another aspect, a reconstructor includes a processor that reconstructs measured projection data using an iterative statistical reconstruction algorithm that reduces or mitigates image artifact caused by differences in variances in projections used to update a voxel of the image for one or more voxels of the image According to another aspect, a computer readable storage medium encoded with computer executable instructions, which, when executed by a processor of a computer, cause the processor to: reduce image artifact caused by differences in variances in projections used to update a voxel of an image for one or more voxels of the image using an iterative statistical reconstruction algorithm The invention may take form in various components and arrangements of components, and in various steps and arrangements of steps. The drawings are only for purposes of illustrating the preferred embodiments and are not to be construed as limiting the invention.

Figure 1:
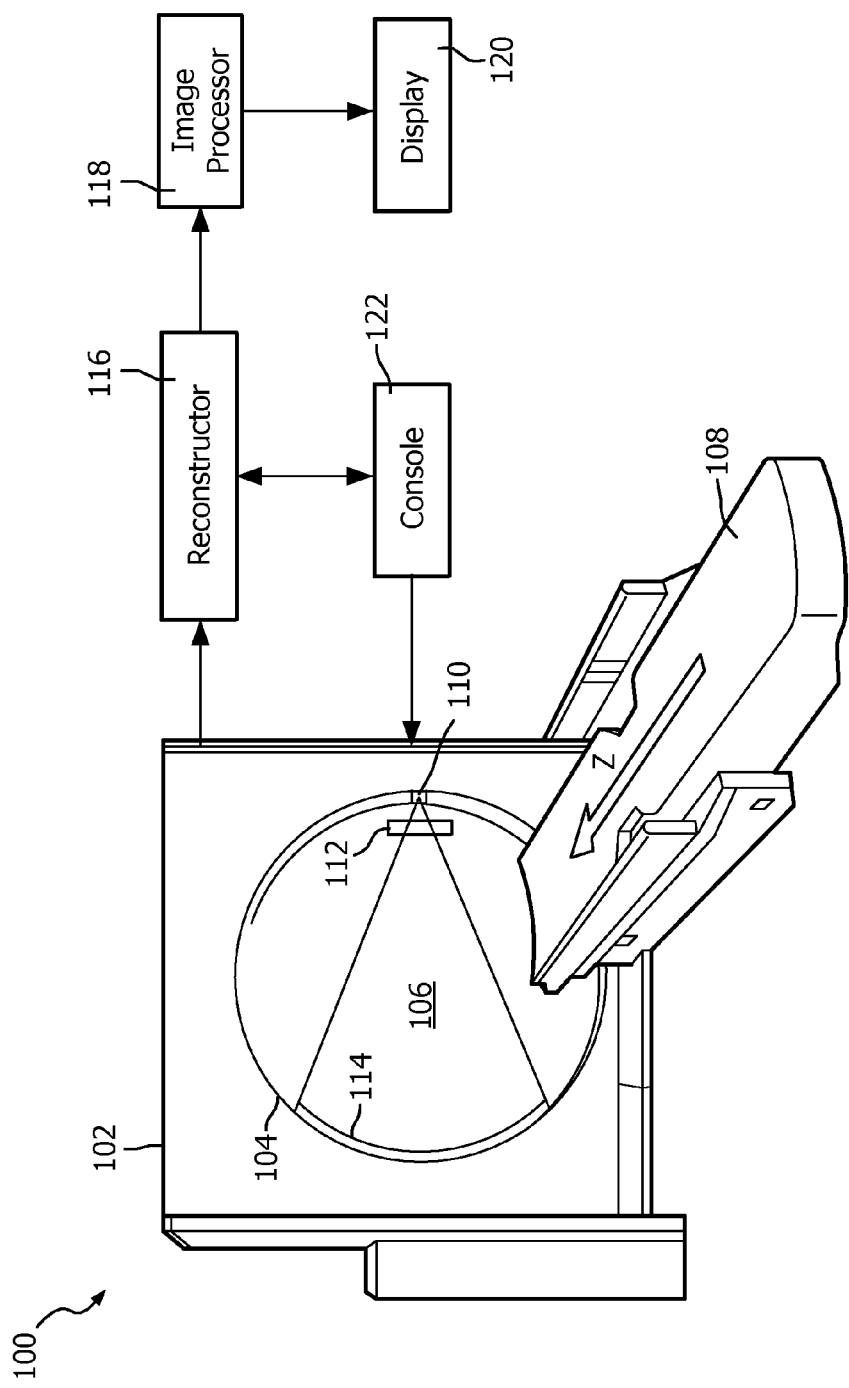
FIG. 1 illustrates an example imaging system with a reconstructor configured to employ an iterative statistical reconstruction algorithm having an update term with a variance based weighting factor that is constant for each projection for each voxel of the image.

FIG. 1 illustrates an imaging system 100 such as a computed tomography (CT) scanner. The imaging system 100 includes a stationary gantry 102 and a rotating gantry 104, which is rotatably supported by the stationary gantry 102. The rotating gantry 104 rotates around an examination region 106 about a longitudinal or z-axis. A support 108, such as a couch, supports a subject in the examination region 106 and can be used to position the subject with respect to x, y, and/or z axes before, during and/or after scanning.

A radiation source 110, such as an x-ray tube, is supported by the rotating gantry 104 and rotates with the rotating gantry 104 about the examination region 106, and emits radiation that traverses the examination region 106. A source collimator 112 collimates the emitted radiation to produce a generally fan, wedge, or cone shaped radiation beam that traverses the examination region 106. A radiation sensitive detector array 114, located opposite the radiation source 110 across the examination region 106, includes a plurality of detector pixels that detect radiation traversing the examination region 106 and generate projection data indicative thereof.

A reconstructor 116 reconstructs the projection data and generates volumetric image data indicative of the examination region 106. The illustrated reconstructor 116 is configured to utilize, at least, an iterative reconstruction algorithm. Generally, for an iterative reconstruction algorithm, an initial image (i.e., voxels) is forward projected producing estimated projection data, the estimated projected data is compared with the measured projection data, and the initial image is updated if the difference between the estimated projected data and the measured projection data does not satisfy predetermined stopping criteria. The above is repeated using the updated image until the stopping criteria is satisfied.

A suitable iterative statistical reconstruction algorithm incorporates a noise model. As described in greater detail below, in the illustrated embodiment, iterative statistical reconstruction algorithm incorporates a voxel update term with a variance based weighting function that is constant for each projection for a voxel for one or more of voxels of the image. As such, streak artifact introduced by using a variance based weighting function that varies from projection to projection for a voxel such that different projections contribute to the update of a voxel to different degree is reduced or mitigated. The iterative reconstruction algorithm may be based on expectation-maximization (EM), maximum likelihood (ML), and/or other iterative reconstruction algorithm.

An image processor 118 processes the volumetric image data and generates one or more images indicative of the detected radiation. A display 120 is utilized to present the one or more images. A general purpose computing system serves as an operator console 122, and includes an output device such as a display and an input device such as a keyboard, mouse, and/or the like. Software resident on the console 122 allows the operator to control the operation of the system 100, for example, allowing the operator to select a protocol that employs the iterative statistical algorithm, identify a noise model for the iterative statistical algorithm, identify a weighting factor for the iterative statistical algorithm, initiate scanning, etc.

Figure 2:
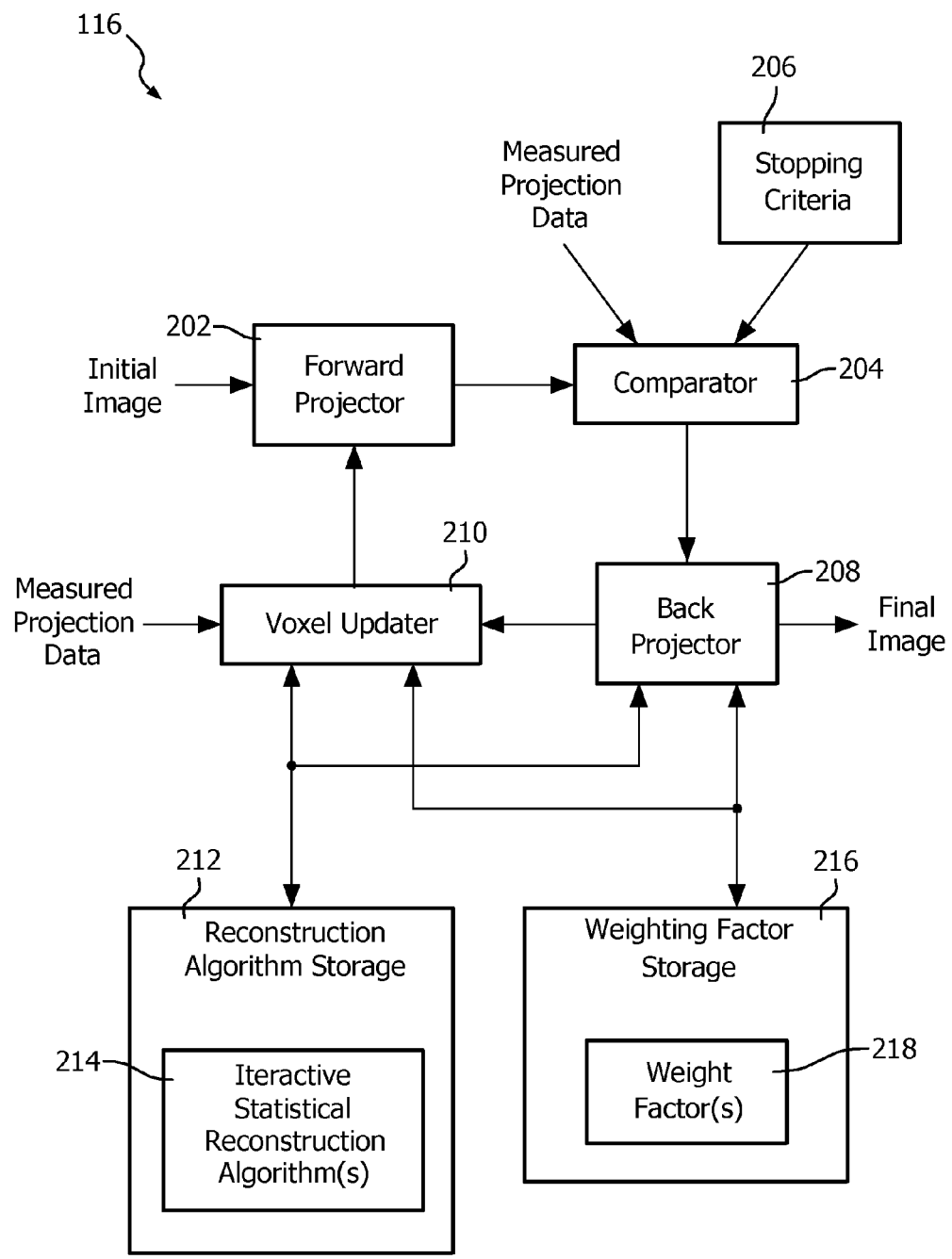
FIG. 2 illustrates an example of the reconstructor in connection with a suitable iterative statistical reconstruction algorithm.

FIG. 2 illustrates an example of the reconstructor 116.

The illustrated reconstructor 116 includes a forward projector 202 that forward projects an initial image to generate estimated projection data. A comparator 204 compares the estimated projection data with the measured projection data. A difference between the estimated projection data and the measured projection data is used to update the forward projected image (via a backprojector 208), and the update is used as input for the forward projector or as a final image, depending on predetermined stopping criteria 206. The backprojector 208 backprojects the difference to generate the updated image based on an iterative statistical reconstruction algorithm. The stopping criteria 206 may be based on the closeness of the forward projected data to the measured projection data, a number of iterations, and/or other stopping criteria.

A voxel updater 210 updates the image based on the backprojected update image and an iterative statistical reconstruction algorithm 214. Where the comparator 204 determines that the comparison satisfies the predetermined stopping criteria 206, this image is used as the final image. Where the comparator 204 determines that the comparison does not satisfy the predetermined stopping criteria 206, the iterative process continues with a new forward projection of the updated image via the backprojector 208 as described herein. In the illustrated embodiment, reconstruction algorithm storage 212 stores one or more iterative statistical based reconstruction algorithms 214. An example of a suitable algorithm includes an iterative statistical reconstruction algorithm with an update term with a variance based weighting factor.

An example of such an iterative statistical reconstruction algorithm (which is based on the assumption of Gaussian noise in the measured data) is shown in EQUATION 1:

$$\mu_j^{n+1} = \mu_j^n + \frac{\sum_p \sum_i a_{pij} \frac{1}{\sigma_{pi}^2} (m_{pi} - l_{pi}^n)}{\sum_p \sum_i a_{pij} \frac{1}{\sigma_{pi}^2} a_{pi}}, \quad \text{EQUATION 1}$$

wherein j represents the voxel index, n represents the iteration number, $\mu_j^n$ represents the current value of the voxel j, $\mu_j^{n+1}$ represents a next value of the voxel j, and $$\frac{\sum_p \sum_i a_{pij} \frac{1}{\kappa_{pj}^2} (m_{pi} - l_{pi}^n)}{\sum_p \sum_i a_{pij} \frac{1}{\kappa_{pj}^2} a_{pi}}$$

represents the update term.

In the update term, p represents the projection, i represents the measurement in the projection p, $a_{pij}$ represent the elements of the system matrix (the intersection of voxel i with the ray belonging to measurement i in the projection p), $\sigma_{pi}$ represents the standard deviations of the measurement i, m represents the measured values of the measurement i of the projection p, $l_{pi}$ represents the forward projection of the image, $(m_{pi}-l_{pi})$ is the difference between the measured and forward projected data and determines whether the update term adds to or subtracts from $\mu_j^n$, and $a_{pi}$ represents the forward projection of a unity image.

$1/\sigma_{pi}^2$ represents the variance based weighting factor for each measurement i of the projection p for the voxel j. The fact that several measurements within one projection can contribute to the update of one voxel (or blob) complies with the fact that for a constant j and p several matrix elements $a_{pij}$ are not zero. Since the corresponding standard deviations $\sigma_{pi}$ may substantially vary under certain circumstances, streak artifacts may appear in the image when using EQUATION 1.

Weighting factor storage 216 stores one or more weighting factors 218 that can be used by the backprojector 208 with the iterative statistical reconstruction algorithms 214. An example of a suitable variance based weighting factor is shown in EQUATION 2:

$$\kappa_{pj}^2 = \frac{1}{N_{I_{pj}}} \sum_{i \in I_{pj}} \sigma_{pi}^2, \quad \text{EQUATION 2}$$

wherein $I_{pj}$ represents the indices of all measurements in projection p for the voxel j for which the system matrix elements $a_{ipj}$ are not zero and $N_{I_{pj}}$ represents the number of such measurements. The weighting factor of EQUATION 2 is constant for each projection and a voxel for each voxel in the image.

As such, using EQUATION 2 in place of $1/\sigma_{pi}^2$ in EQUATION 1 reduces or mitigates the streak artifacts caused by a varying $1/\sigma_{pi}^2$ term. Replacing $1/\sigma_{pi}^2$ in EQUATION 1 with EQUATION 2 renders EQUATION 3:

$$\mu_j^{n+1} = \mu_j^n + \frac{\sum_p \sum_i a_{pij} \frac{1}{\kappa_{pj}^2} (m_{pi} - l_{pi}^n)}{\sum_p \sum_i a_{pij} \frac{1}{\kappa_{pj}^2} a_{pi}}. \quad \text{EQUATION 3}$$

In the illustrated embodiment, the backprojector 208 employs EQUATION 3 to update the voxels in the image. The measured projection data is used to calculate $\kappa_{pj}^2$.

It is to be understood that the weighting factor of EQUATION 2 is only one example of a suitable weighting factor. Examples of other suitable weighting factors include a square of an average of the standard deviations, a reciprocal of the average of the reciprocals of standard deviations or variances, a weighted averaging using the system matrix elements, a weighted average of one or more of the above, and/or other weighting factors.

Figure 3:
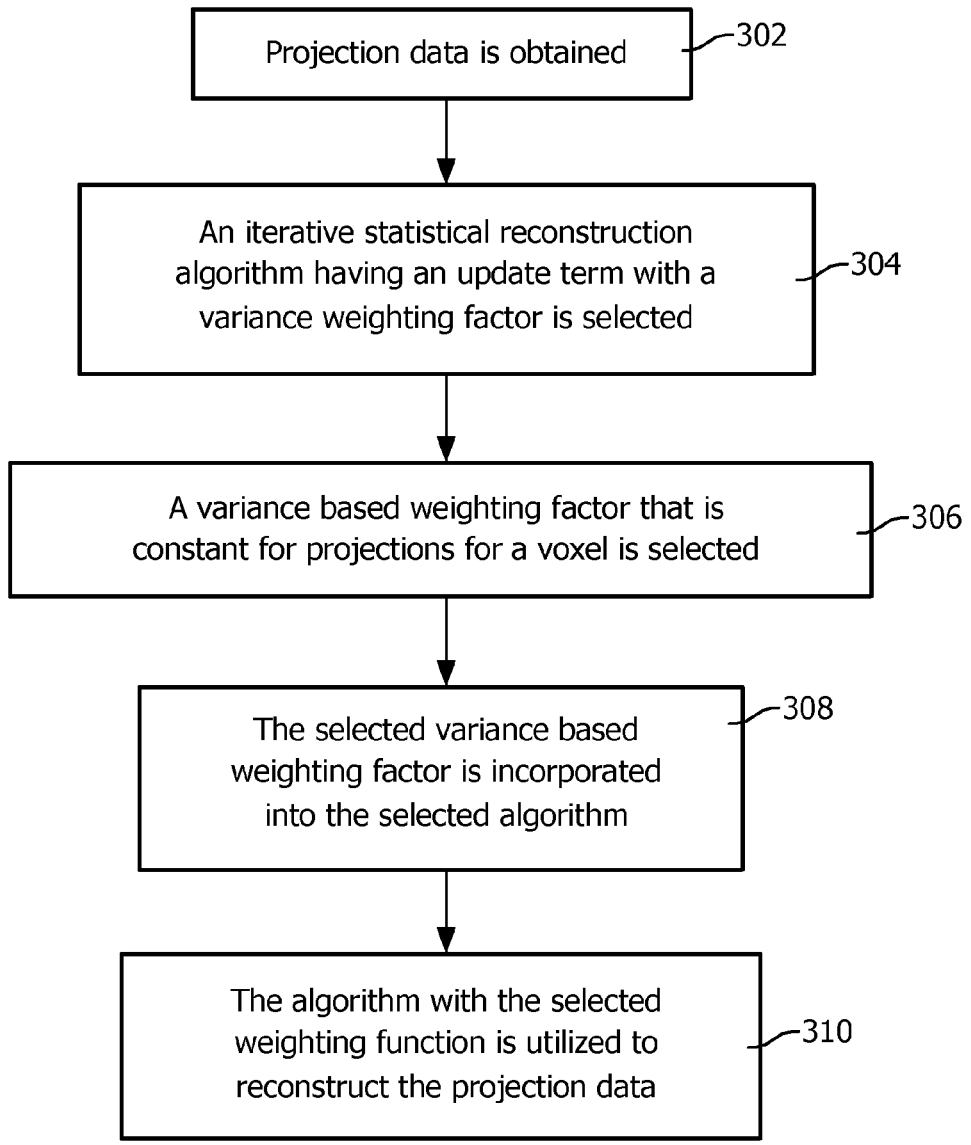
FIG. 3 illustrates an example method for employing the iterative statistical reconstruction algorithm.

FIG. 3 illustrates a method for employing the iterative statistical reconstruction algorithm It is to be appreciated that the ordering of the acts is not limiting. As such, in other embodiments, the ordering of the acts may be different. In addition, one or more of the acts can be omitted and/or one or more other acts can be added.

At 302, projection data is obtained. The projection data can be from the imaging system 100 and/or other imaging system.

At 304, an iterative statistical reconstruction algorithm including an update term with a variance based weighting factor is selected.

At 306, a variance based weighting factor that is constant for each projection and each voxel is selected.

At 308, the selected variance based weighting factor is incorporated into the selected iterative statistical reconstruction algorithm.

At 310, the iterative statistical reconstruction algorithm with the selected variance based weighting factor is utilized to iteratively reconstruct the projection data as described herein.

The above can be implemented by way of one or more processors executing one or more computer readable instructions encoded on computer readable storage medium such as physical memory. Additionally or alternatively, the computer readable instructions can be included in a signal or carrier wave.

Figure 4:
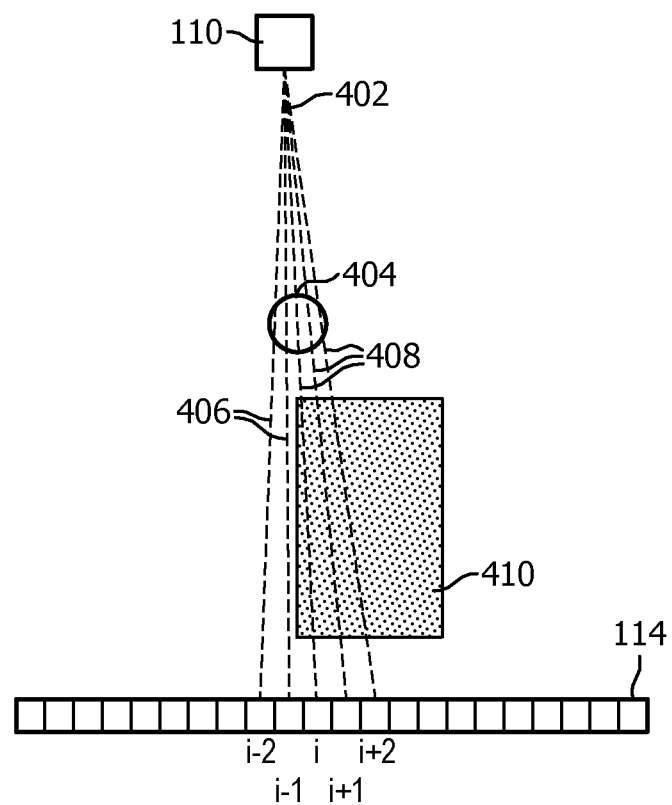
FIG. 4 illustrates a use-case scenario using the iterative statistical reconstruction algorithms.

An example use-case scenario is shown in FIG. 4.

From FIG. 1, the system 100 includes the radiation source 110 and the radiation sensitive detector array 114. In this example, the radiation source 110 emits a radiation beam 402 with at least rays 406 and 408 that traverses a voxel or blob 404 and project on the radiation sensitive detector array 114.

In the illustrated example, the rays 406 of the radiation beam 402 traverse air and/or low attenuating material and project onto detector pixels i−2 and i−1 of the detector array 114, and the rays 408 of the radiation beam 402 traverse additionally a highly attenuating material 410 and project onto detector pixels i, i+1 and i+2 of the detector array 114. Generally, in this example, the rays 406 traverse no or relatively lower attenuating material (e.g., soft tissue) and the rays 408 traverse relatively higher attenuating material (e.g., bone).

As such, for iterative reconstruction, measurements from the neighboring detector pixels i−2 to i+2 of the illustrated projection contribute to the update of the voxel or blob 404. Each of these measurements has an individual variance, and the variances differ significantly between the rays 406, which traverse air (or a relatively lower attenuating material), and the rays 408, which traverse the relatively higher attenuating material 410.

However, using EQUATION 3, the variance based weighting factor for each projection traversing the blob 404 is the same, regardless of the differences in the variances between rays 406 and 408. As such, the measurements with low variance corresponding to rays 406 have the same influence on the update as the measurements with high variance corresponding to the rays 408. As a result, streak artifact that would otherwise be introduced into the images as a result of the different variances is reduced or mitigated.

The reconstructor 116 can be implemented via one or more processors executing one or more computer readable instructions encoded on computer readable storage medium such as physical memory. The reconstructor 116 can be part of a computing workstation, the console, and/or other computing system. Additionally or alternatively, the computer readable instructions can be included in a signal or carrier wave.

The invention has been described with reference to the preferred embodiments. Modifications and alterations may occur to others upon reading and understanding the preceding detailed description. It is intended that the invention be construed as including all such modifications and alterations insofar as they come within the scope of the appended claims or the equivalents thereof.

What is claimed is:

1. A method, comprising:
sensing, with a radiation sensitive detector array of an imaging system, radiation traversing an examination region and a portion of a subject or object therein and generation projection data indicative thereof; and
reconstructing the generated projection data using an iterative statistical reconstruction algorithm that reduces or mitigates image artifact caused by differences in variances in projections of the projection data used to update a voxel of the image for one or more voxels of the image, wherein the iterative statistical reconstruction algorithm includes the following voxel update term:

$$\frac{\sum_p \sum_i a_{pij} \frac{1}{\kappa_{pj}^2} (m_{pi} - l_{pi}^n)}{\sum_p \sum_i a_{pij} \frac{1}{\kappa_{pj}^2} a_{pi}}$$

wherein p represents a projection, i represents a measurement in the projection p, j represents a voxel index, $a_{pij}$ represent elements of a system matrix, $m_{pi}$ represents measured values of the measurement i of the projection p, n represents an iteration number, $I_{pi}$ represents the forward projection of the image, $a_{pi}$ represents a forward projection of a unity image, and $\kappa_{pj}^2$ represents the constant variance based weighting factor.

2. The method of claim 1, wherein the update term includes a variance based weighting factor.

3. The method of claim 2, wherein the variance based weighting factor for a given voxel is constant within a projection for a predetermined number of measurements that contribute to the update of the voxel.

4. The method of claim 2, wherein the variance based weighting factor is an average variance of the measurements within the one projection used to update the voxel of the image.

5. The method of claim 2, wherein the variance based weighting factor is a reciprocal of the average of the reciprocal of the variance.

6. The method of claim 2, wherein the variance based weighting factor is the square of an average standard deviation of the measurements within the one projection used to update the voxel of the image.

7. The method of claim 2, wherein the variance based weighting factor is a square of the reciprocal of the average of the reciprocals of standard deviations.

8. The method of claim 4, wherein the averaging is weighted using the system matrix elements.

9. The method of claim 1, wherein a first sub-set of the rays within projections traverses air or a lower attenuating material and a second sub-set of the rays within the projections traverses a higher attenuating material.

10. The method of claim 9, further comprising:
   determining first variances for the first sub-set; and
   determining second variances for the second sub-set, wherein the first variances and the second variances are different.

11. The method of claim 10, wherein the first variances are lower than the second variances.

12. The method of claim 1, further comprising forward projecting an initial image, producing estimated projection data;
   comparing the estimated projected data with the projection data;
   updating corresponding voxels of the image in response to the comparison not satisfying predetermined stopping criteria; and
   generating a final image in response to the comparison satisfying the predetermined stopping criteria.

13. An imaging system, comprising:
   a radiation sensitive detector array that detects radiation traversing an examination region and a portion of a subject or object therein and generates projection data indicative thereof; and
   a reconstructor with a processor that reconstructs the projection data using an iterative statistical reconstruction algorithm that reduces image artifact caused by differences in variances in projections used to update a voxel of the image for one or more voxels of the image, wherein the reconstructor employs an iterative statistical reconstruction algorithm that includes a voxel update term with a constant variance based weighting factor for projection for a predetermined number of measurements contributing to the update of the voxel, and wherein the voxel update term is:

$$\frac{\sum_p \sum_i a_{pij} \frac{1}{\kappa_{pj}^2} (m_{pi} - l_{pi}^n)}{\sum_p \sum_i a_{pij} \frac{1}{\kappa_{pj}^2} a_{pi}}$$

wherein p represent a projection, i represents a measurement in the projection p, j represents a voxel index, $a_{pij}$ represent elements of a system matrix, $m_{pi}$ represents measured values of the measurement i of the projection p, n represent an iteration number, $I_{pi}$ represents the forward projection of the image, $a_{pi}$ represents a forward projection of a unity image, and $\kappa_{pj}^2$ represents the constant variance based weighting factor.

14. The reconstructor of claim 13, wherein the constant variance based weighting factor is:

$$\frac{1}{N_{I_{pj}}} \sum_{i \in I_{pj}} \sigma_{pi}^2$$

wherein $\sigma_{pi}^2$ represents a variance of each measurement i of the projection p for the voxel j, $I_{pj}$ represents indices of the measurements in projection p for the voxel j for which the system matrix elements $a_{ipj}$ are not zero, $N_{I_{pj}}$ represents the number of the measurements.

15. The reconstructor of claim 13, wherein the variance based weighting factor is at least one of an average variance of the projections used to update the voxel of the image, a reciprocal of the average reciprocal variance, a square of an average standard deviation of the projections used to update the voxel of the image, a square of a reciprocal of the average reciprocal standard deviation, a weighted average using system matrix elements, or a weighted combination of one or more thereof.

16. The reconstructor of claim 13, wherein a first sub-set of the rays within projections traverses air or a lower attenuating material and a second sub-set of the rays within projections traverses a higher attenuating material, wherein first variances of the first sub-set are lower than second variances of the second sub-set.

17. The reconstructor of claim 13, wherein the processor forward projects an initial image, producing estimated projection data; compares the estimated projected data with the projection, updates corresponding voxels in response to the comparison not satisfying predetermined stopping criteria, and generates a final image in response to the comparison satisfying the predetermined stopping criteria.

18. A non-transitory computer readable storage medium encoded with computer executable instructions, which, when executed by a processor of a computer, cause the processor to:
   control a radiation sensitive detector array sensing radiation traversing an examination region and a portion of a subject or object therein to generate projection data indicative thereof; and
   reconstruct the projection data using an iterative statistical reconstruction algorithm with the following voxel update term:

$$\frac{\sum_p \sum_i a_{pij} \frac{1}{\kappa_{pj}^2} (m_{pi} - l_{pi}^n)}{\sum_p \sum_i a_{pij} \frac{1}{\kappa_{pj}^2} a_{pi}}$$

wherein p represents a projection, i represents a measurement in the projection p, j represents a voxel index, $a_{pij}$ represent elements of a system matrix, $m_{pi}$ represents measured values of the measurement i of the projection p, n represents an iteration number, $I_{pi}$ represents the forward projection of the image, $a_{pi}$ represents a forward projection of a unity image, and its $\kappa_{pj}^2$ represents the constant variance based weighting factor.

19. The method of claim 1, wherein the constant variance based weighting factor is:

$$\frac{1}{N_{I_{pj}}} \sum_{i \in I_{pj}} \sigma_{pi}^2$$

wherein $\sigma_{pi}^2$ represents a variance of each measurement i of the projection p for the voxel j, $I_{pj}$ represents indices of the measurements in projection p for the voxel j for which the system matrix elements $a_{ipj}$ are not zero, $N_{I_{pj}}$ represents the number of the measurements.

20. The non-statutory computer readable storage medium of claim 18, wherein the constant variance based weighting factor is:

$$\frac{1}{N_{I_{pj}}} \sum_{i \in I_{pj}} \sigma_{pi}^2$$

wherein $\sigma_{pi}^2$ represents a variance of each measurement i of the projection p for the voxel j, $I_{pj}$ represents indices of the measurements in projection p for the voxel j for which the system matrix elements $a_{ipj}$ are not zero, $N_{I_{pj}}$ represents the number of the measurements.

* * * * *